UNITED STATES PATENT OFFICE.

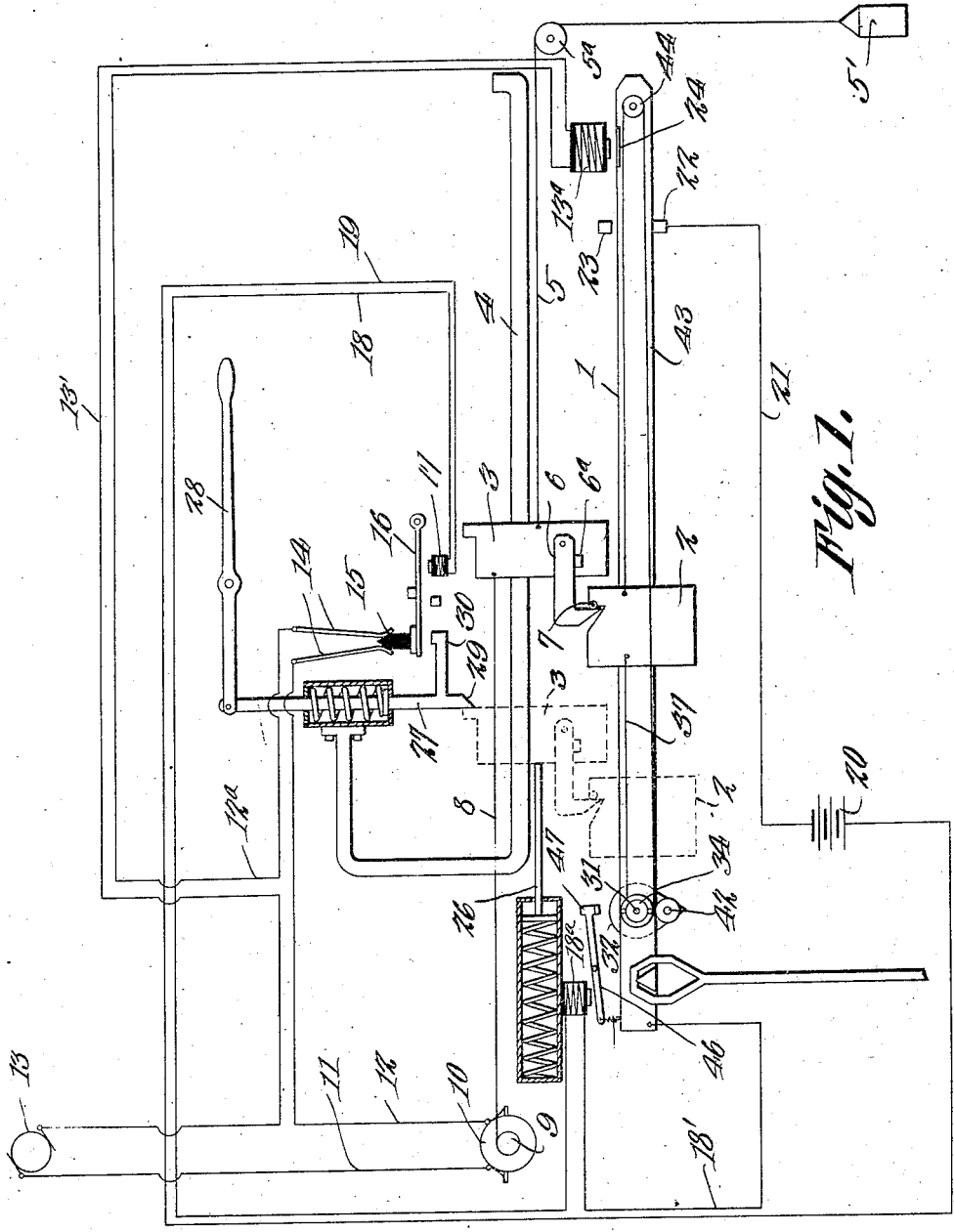

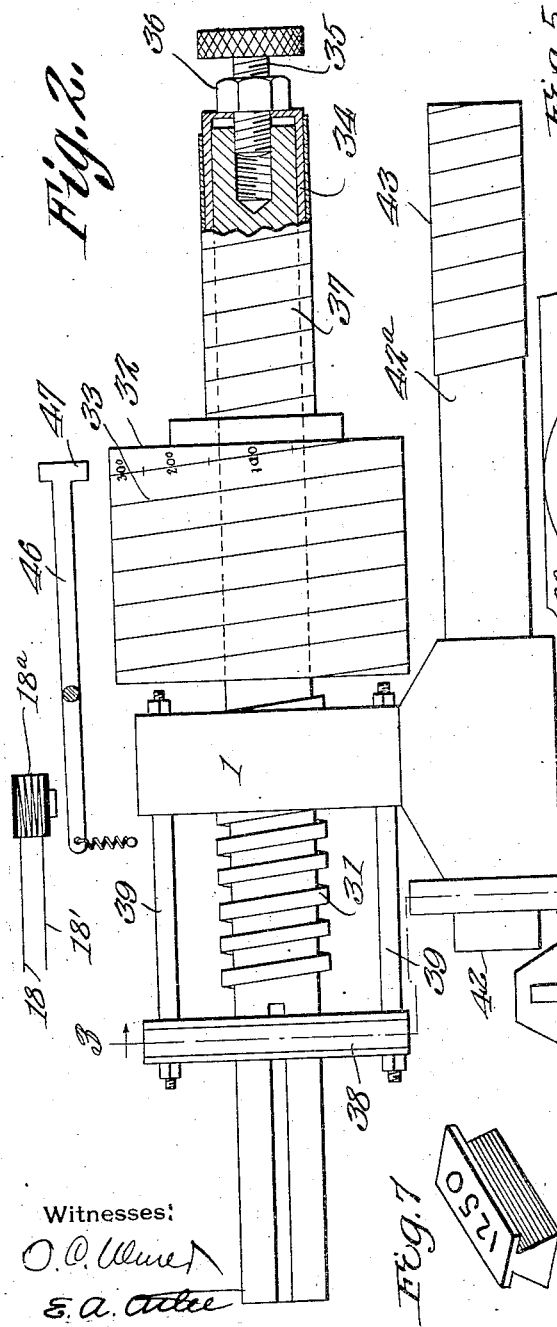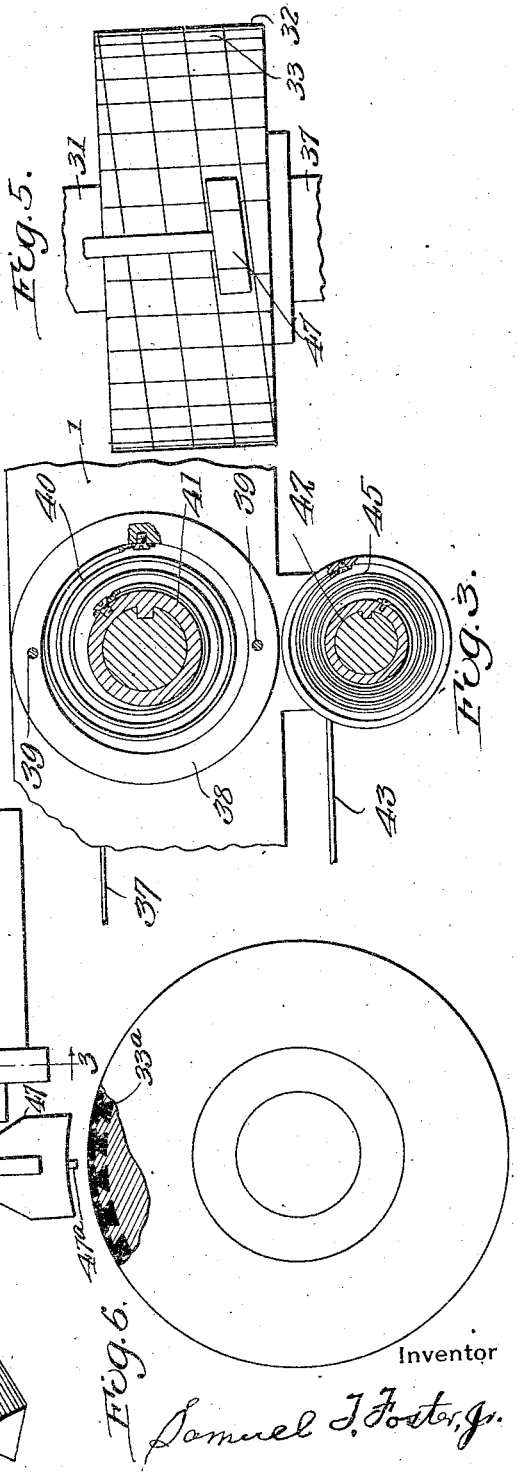

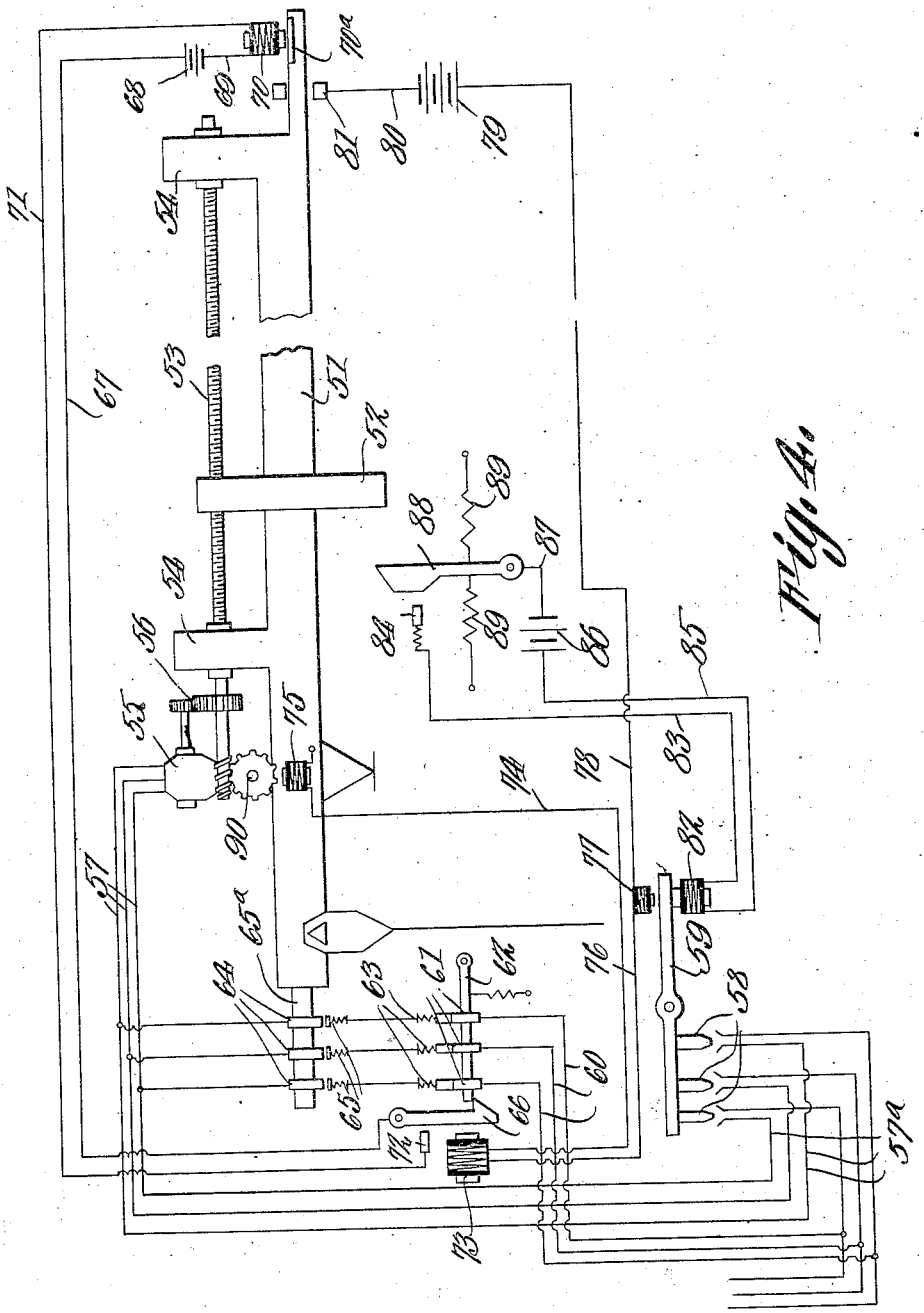

SAMUEL T. FOSTER, JR., OF LAREDO, TEXAS.

AUTOMATIC WEIGHING-SCALE.

1,254,668.  Specification of Letters Patent.  Patented Jan. 29, 1918.

Application filed June 5, 1915. Serial No. 32,357.

*To all whom it may concern:*

Be it known that I, SAMUEL T. FOSTER, Jr., a citizen of the United States, residing at Laredo, in the county of Webb and State of Texas, have invented a new and useful Automatic Weighing-Scales, of which the following is a specification.

The present invention appertains to weighing scales, and aims to provide a novel and improved automatic scale.

It is the object of the invention to provide an electrically controlled automatic recording scale, improved generally in its construction and details, to enhance the utility and efficiency thereof.

The present invention embodies means for automatically moving the poise along the scale beam when the device is set in operation, until the beam tilts, whereupon another means comes into play for stopping the movement of the poise, means being provided for then recording the weight indicated, and means also being provided for returning the poise to initial or normal position after the recording operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a diagrammatical view of the invention.

Fig. 2 is an elevation of the recording device, portions being broken away, and portions being illustrated diagrammatically.

Fig. 3 is a section on line 3—3 of Fig. 2.

Fig. 4 is a diagrammatical view of a modified form of the invention.

Fig. 5 is a plan view of the type drum and the printing hammer.

Fig. 6 is an end view of the type drum and the printing hammer, showing a portion of the former broken away.

Fig. 7 is a perspective view of a type such as used on the type drum as 33$^a$.

In carrying out the invention, reference being had to Figs. 1, 2, and 3, the invention is applied to or associated with the beam 1 of an ordinary platform scale, and the poise 2 which is slidable upon the scale beam 1. The means for moving the poise 2 embodies the slide 3 mounted for movement upon a longitudinal guide rail 4 mounted in any suitable manner above the beam 1, a cord or other flexible element 5 being attached to the slide 3 and passing over a pulley wheel 5$^a$ mounted adjacent the free end of the beam 1, and a weight 5' is attached to the free end of the flexible element 5 so that the weight 5' tends to pull the slide 3 toward the free end of the scale beam, or away from the fulcrum thereof. A hook 6 is pivoted to the slide 3 and its downward movement is limited by a stop 6$^a$ carried by the slide, the bill of the hook 6 being engageable with a roller 7 carried by the poise 2. When the slide 3 is free to move, the weight 5' in pulling the same way from the fulcrum of the beam 1 will cause the hook 6 to carry the poise 2 with the slide 3. The hook 6 in engaging the roller 7 of the poise 2, will allow the hook to swing slightly relative to the poise, without disturbing the operative connection between the slide and the poise.

The means for returning the slide 3 and poise 2 to normal or initial position, embodies a cord or flexible element 8 attached to the slide 3 and attached to and adapted to be wound upon the reel 9 attached to and operated by an electric motor 10. One terminal of the motor 10 is connected by a conductor 11 to a generator or other source of electrical energy 13, and the other terminal of the motor 10 is connected by a conductor 12 to one of a pair of spring contacts 14. The other spring contact 14 is connected by means of a conductor 12$^a$ to an electromagnet 13$^a$, and the other terminal of the electromagnet 13$^a$ is connected by means of a conductor 13' to the generator 13. The generator 13, motor 10, spring contacts 14 and electromagnet 13$^a$ are thus connected in series, and an insulated plug or jack 15 is normally inserted between the free ends of the spring contacts or switch elements 14, to hold them separated. The insulating plug or jack 15 is carried by a pivoted armature 16 which is adapted to be attracted by an electromagnet 17 to remove the jack from between the spring contacts 14.

The jack 15 being disposed between the spring contacts 14 serves to open the motor circuit, whereby the motor is rendered inoperative until the jack 15 is retracted from between the contacts 14. This is effected by means of the electromagnet 17, which when energized attracts the armature 16. The electromagnet 17 is arranged to be energized when the scale beam 1 tilts or drops after the poise 2 has reached the proper position upon the scale beam, according to the weight of the object upon the platform (not shown). To this end, one terminal of the electromagnet 17 is connected by means of a conductor 18 to an electromagnet 18ª which constitutes a part of the recording device, and the other terminal of the electromagnet 18ª is connected by means of a conductor 18' to the beam 1. The other terminal of the electromagnet 17 is connected by means of a conductor 19 to a battery or other source of electrical energy 20, and the other pole of the battery 20 is connected by means of a conductor 21 to a contact 22 arranged below the scale beam 1 and upon which the scale beam rests when the scale beam is tilted or moved downwardly by the poise 2. A suitable stop 23 is disposed above the scale beam 1 above the contact 22, the contact 22 also serving as a stop, whereby the stops 22 and 23 will limit the movement of the scale beam 1 properly. It is evident at this point, that when the scale beam 1 drops and engages the stop or contact 22, the scale beam which acts as a switch for the circuit through the electromagnets 17 and 18ª, closes the said circuit, so that the current created by the battery 20 is free to flow through the conductor 21, scale beam 1, conductor 18', electromagnet 18ª, conductor 18, electromagnet 17, and conductor 19 back to the battery 20.

An armature 24 is carried by the free end of the scale beam 1, and is arranged to be attracted by the electromagnet 13ª which is supported in any suitable manner above the free end of the scale beam 1, whereby when the motor circuit is closed, the electromagnet 13ª will be energized for lifting the scale beam 1 to normal raised position.

A spring pressed buffer 26 is mounted above the fulcrum end of the scale beam 1 in the path of the slide 3 to gently arrest the movement of the slide 3 when it is returned to initial position, and to prevent the jarring of the structure.

A spring depressed plunger 27 removably mounted in any suitable manner above the guide rail 4, and its upper end is connected to a hand rail 28. The lower end of the plunger 27 provides a pawl 29 with which the upper portion of the slide 3 is coöperable, so that when the slide 3 is in normal or initial position, the pawl 29 will hold it at such position. The plunger 29 has an angularly extended arm 30 projecting below the armature 16 and arranged to raise the armature 16 when the plunger 27 is raised either by the lever 28 or by the slide 3, to force the jack 15 between the spring contacts 14.

Coming to the recording device, the same embodies a screw 31 threaded through the fulcrum portion of the scale beam 1, and having a drum 32 secured thereon at one side of the beam 1. The drum 32 is provided with a spiral line or path 33 upon its periphery which may be suitably graduated to correspond with the graduations of the scale beam 1. These graduations on the periphery of the drum 32 are preferably numbered with raised type 33ª. One of these raised type is shown in Fig. 7.

A sleeve 34 is slipped over one end of the screw 31 and bears against the drum 32, the sleeve 34 providing a reel. A clamping screw 35 is threaded into the said end of the shank of the screw 31, and a nut 36 is threaded upon the screw 35 and bears against the outer end of the reel 34 to clamp the reel against the drum 32. When the nut 36 is loosened, the reel 34 may be adjusted about its axis, when it is desired to adjust the recording device. A tape or flexible element 37 is attached to and normally wound upon the reel 34, and the tape or flexible element 37 is attached to the poise 2.

The screw 31 is spring pressed, whereby it will be properly returned to initial position after the recording operation, and to this end, a ring 38 is connected by means of bolts or other bracket elements 39 to the beam 1, and a spiral spring 40 which is disposed within the ring 38 has its outer end attached to the said ring, and has its inner end secured to a collar 41 feathered upon that end portion of the shank of the screw 31 remote from the reel 34.

A shaft 42 is also journaled to the beam 1 adjacent the screw 31, and one end portion of the shaft 42 provides a reel 42ª upon which a tape or flexible element 43 is normally wound. The flexible element 43 passes around a pulley 44 carried by the free end of the beam 1, and the flexible element 43 is attached to the poise 2. The shaft 42 is connected by means of a spiral spring 45 to the beam 1, whereby the spring 45 tends to so rotate the shaft 42 as to wind the flexible element 43 upon the reel 42ª. The springs 40 and 45 render the flexible elements 37 and 43, respectively, taut, whereby when the poise 2 is moved along the scale beam 1, the screw 31 will be properly rotated to carry the drum 32 therewith without any lost motion or play. It should be noted that for any position of the poise along the beam 1, that the amount of tape or flexible element carried by the beam 1 is always the same, and if both flexible elements 37 and 43 are alike and uniform, they will not affect the accuracy of the weighing operation.

The recording device also includes a armature 46 coöperable with the electromag net 18ª to be attracted thereby, and having a printing or marking hammer 47 of suitable character which is coöperable with the drum 32 whereby when the armature 46 is attracted by the electromagnet 18ª, the hammer 47 will be swung against the periphery of the drum 32 and will impress a suitable mark upon a record sheet imposed upon the drum. The raised type on the drum above mentioned may be inked, or an ink ribbon may be used or may be simply pressed into a record sheet made of soft paper when struck with the hammer 47, and the hammer 47 should be of such width and curvature as to cover the space on the periphery of the drum 32 that two or three numbered graduations occupy. Also the face of the hammer 47 should have a rib or other suitable marker 47ª along its center and parallel to the axis of the drum 32 that will leave an impression on the record sheet. Then in any operation, of the two or three numbers printed on the record sheet (not shown) the one nearest to the central line impressed by the aforesaid rib in the face of the hammer, will be the one that will indicate the weight of the object weighed. And if more accuracy is wanted then interpolation can be resorted to.

In operation, supposing the poise 2 and slide 3 to be returned and disposed at normal position, as seen in dotted lines in Fig. 1, the pawl 29 will hold the slide 3 at said position, and the scale beam 1 will be in its raised position while the various electrical devices will be deënergized or inoperative. Now when the object to be weighed is disposed upon the platform (not shown), the lever 28 is swung so as to raise the plunger 27 and thereby disengage the pawl 29 from the slide 3, and this will liberate the slide 3, so that the weight 5' comes into play for moving the slide 3 with suitable velocity along the guide rail 4. The poise 2 will be carried with the slide 3. The lever 28 is then released so that the plunger 29 is again depressed, and when the poise 2 reaches the proper graduation of the beam 1, to cause the beam to tilt or drop, the beam will then be depressed into engagement with the contact 22, and this will close the circuit through the electromagnets 17 and 18ª as above indicated. The electromagnet 17 being energized will attract the armature 16, and thus withdraw the jack 15 from between the spring contacts 14, and the contacts 14 will then spring into engagement with one another for closing the motor circuit, it being evident that when the contacts 14 engage one another, current is free to flow from the generator 13 through the conductor 11, motor 10, conductor 12, contacts 14, conductor 12ª, electromagnet 13ª and conductor 13' back to the generator. At the same time that the armature 16 is attracted by the electromagnet 17, the armature 46 is attracted by the electromagnet 18ª, and this causes the printing or marking hammer to impinge upon the periphery of the recording drum 32. It is to be noted that when the poise 2 is moved along the beam 1, as above indicated, the flexible element 37 will be unwound from the reel 34, and this will rotate the screw 31, and the screw rotating within the threaded bore of the beam 1 will be moved longitudinally, so that the drum 32 will be both rotated and shifted longitudinally. This will cause the printing hammer 47 to strike the proper place upon the graduated line 33 upon the periphery of the drum, and to cause an impression or a printing of the raised type, that happen to be directly opposite the face of the hammer, on a sheet of paper (not shown) that may be inserted between the face of the hammer 47 and the periphery of the drum 32, the said sheet of paper may be inserted by hand or by any of the many known methods now in use for feeding paper to the typewriting machines or other printing or marking machines. The drum 32 is thus rotated and shifted longitudinally proportionately to the amount of movement of the poise 2 along the scale beam 1, whereby the weight of the object will be recorded upon a sheet of paper disposed upon the drum for that purpose. As soon as the motor circuit is closed, the recording operation is carried out instantly, and the motor circuit being closed will energize the electromagnet 13ª which will then attract the armature 34 so as to raise the scale beam 1. This opens the circuit through the electromagnets 17 and 18ª, and the electromagnets 17 and 18ª will be deënergized. The armatures 16 and 46 are thus released, the armature 16 remaining adjacent the electromagnet 17, while the armature 46 is spring pressed so as to swing the printing hammer 47 away from the drum 32. The motor 10 being brought into operation, will rotate the reel 9 to wind the flexible element 8 thereon, which will pull the slide 3 back to normal position, it being evident that when the slide 3 was moved along the guide rail 4, the flexible element 8 was unwound from the reel 9. When the slide 3 pulls the poise 2, the slide and poise are slightly separated, so that when the slide 3 is pulled back to normal position, the poise 2 will be momentarily held stationary, to prevent the drum 32 being rotated before the imprint is made. The slide 3 then engages the poise 2 and carries the poise 2 back to initial position. When the slide 3 approaches its initial position, it passes under the pawl 29, and moves the pawl 29 upwardly against the tension of the plunger spring, to thereby raise the arm 30, and the arm 30 will raise the armature 16 for forcing the jack 15 between the spring contacts 14 when the slide 3 reaches its initial position. This will open the motor circuit and therefore stop the motor when the parts have resumed their normal or initial position, and at the same time, the electromagnet 13ª is deënergized to release the scale beam 1.

It is therefore evident, that when the operator swings the lever 28 to set the device in operation, the poise 2 is automatically moved to proper position upon the scale beam, in which event the weight is recorded, and the parts returned to initial position for a new operation.

Referring to Fig. 4 wherein a modified form of the invention is depicted, the numeral 51 designates the beam of a platform scale, which has the poise 52 slidable thereon. The poise 52 is engaged to a longitudinal screw 53 journaled through suitable bearings 54 carried by the beam 51, the screw 53 and the beam 51 being parallel, whereby when the screw 53 is rotated it will carry the poise 52 along the beam. The screw 53 is operatively connected to an electric motor 55 by means of suitable gearing 56, and this motor 55 is in this case a three phase motor although other types of motors can be used by having connection made suitable thereto. Each of the three conductors 57 embodies a switch member 58 which when removed will open the circuit through the respective conductor, and the switch members 58 are carried by an armature 59.

Conductors 60 connect the conductors 57 in parallel with the switch members 58, and the conductors 60 are so connected to the conductors 57, that when the switch members 58 are opened and the circuits are closed through the conductors 60, the motor 55 will be reversed. Thus when the switch members 58 are closed, and the conductors 60 are opened, the motor 55 will rotate in one direction, whereas if the switch members 58 are opened and conductors 60 are closed, the motor 55 will rotate in the other direction.

Each of the conductors 60 includes a switch member 61 coöperable with a spring contact 63, the switch members 61 being carried by a spring pressed lever 62. Each of the conductors 60 also includes a switch member 64 coöperable with a spring contact 65, the switch members 64 being carried by an arm 65ª projecting from the fulcrum end of the beam 51. When the beam 51 is raised, the switch members 64 are swung downwardly into engagement with the contacts 65, but ordinarily the lever 62 is released so that the switch members 61 carried thereby are disengaged from the contacts 63, which will open the circuits through the conductors 60.

The lever 62 is adapted to be held against the tension of its spring, to hold the switch members 61 in engagement with the contacts 63, by means of an armature hook 66, which is connected by means of a conductor 67 to a battery or other source of electrical energy 68, and the other pole of the battery energy 68 is connected by means of a conductor 69 to an electromagnet 70, which coöperates with an armature 70ª carried by the free end of the scale beam 51. The other terminal of the electromagnet 70 is connected by means of a conductor 71 to the contact 72 which coöperates with the hook or latch 66.

An electromagnet 73 coöperates with the armature hook 66 for attracting the same, and has one terminal connected by a conductor 74 to one terminal of a recording electromagnet 75, and the other terminal of the electromagnet 75 is connected to the scale beam 51. The other terminal of the electromagnet 73 is connected by means of a conductor 76 to one terminal of an electromagnet 77 which coöperates with the armature 59, and the other terminal of the electromagnet 77 is connected by means of a conductor 78 to one pole of a battery or other source of electrical energy 79. The other pole of the battery 79 is connected by means of a conductor 80 to a stop and contact 81 below the free end portion of the scale beam 51 and upon which the scale beam is seatable or engageable when the beam drops.

A second electromagnet 82 coöperates with the armature 59 in opposition to the electromagnet 77, and has one terminal connected by means of a conductor 83 to a spring contact 84 and the other terminal of the electromagnet 82 is connected by means of a conductor 85 to one pole of a battery of electrical energy 86. The or other source of electrical energy 86. The other pole of the battery 86 is connected to a switch lever 88 which is held in normal position out of engagement with the contact 84 by means of springs 89. The free end of the switch lever 88 lies in the path of the poise 52 whereby when the poise 52 is returning to initial position, it will move switch lever 88 into engagement with the spring contact 84 for closing the circuit through the electromagnet 82.

In the operation of the modified form, when the poise 52 travels toward the fulcrum end of the beam 51, the poise 52 trips over the switch lever 88 and causes contact to be made between the switch lever 88 and the contact 84, and when the poise 52 travels toward the free end of the beam 51, the poise 52 trips over the switch lever 88 to make contact not cause the switch lever 88 to make contact with the contact 84. Engaging the switch lever 88 with the contact 84 will close the circuit through the electromagnet 82, since current is free to flow from the battery 86 through the conductor 87, switch lever 88, conductor 83, electromagnet 82, and conductor 85 back to the battery. The electromagnet 82 being energized attracts the armature 59, to move the switch members 58 open position whereby the portions 57ᵃ of the conductors 57 which are parallel with the conductors 60, will be opened ordinarily. The lever 62 is normally released so as to disengage the switch members 61 from the contacts 63, and to thereby open the conductors 60 for breaking the connections with the motor, so that the motor is normally dead. The beam 51 being raised swings the switch member 64 carried thereby into engagement with the contacts 65. When the object to be weighed is disposed upon the platform (not shown), the lever 62 is manually raised or swung to bring the switch members 61 into engagement with the contacts 63, and the hook or latch 66 will then engage the lever 62 for holding the lever 62 in place. Current is thus free to flow through the conductors 60 for rotating the rotor of the motor 55 in one direction, for moving the poise 52 away from the fulcrum of the beam 51 toward the free end of the beam. When the poise 52 reaches the proper graduation upon the beam 51, the beam will tilt or drop and therefore engage the contact 81, and this will cause the circuit through the electromagnets 77, 73 and 75 to be closed, since the beam 51 acts as a switch for the said current. Current is thus free to flow from the battery 79 through the conductor 80, beam 51, electromagnet 75, conductor 74, electromagnet 73, conductor 76, electromagnet 77, and conductor 78 back to the battery 79. The electromagnet 73 being energized will attract the armature hook 66, and the lever 62 will therefore be released to disengage the switch members 61 from the contacts 63, and will open the conductors 60, whereby the motor 55 is stopped from rotating in the direction to advance the poise 52, and the electromagnet 75 being energized will operate the recording hammer or instrument (not shown), the same as with the first form of the invention. The screw 90 which threadedly engages the beam 51 is operatively connected to the screw 53 whereby the recording member or drum (not shown) may be properly operated, the same as with the first form. The screw 90 represents the screw 31 of the first form, and the electromagnet 75 is the same as the electromagnet 18ᵃ of the first form. The recording device therefore does not require further description or illustration in connection with the modification. The electromagnet 77 being energized attracts the armature 59, and swings the switch members 58 to closed positions, whereby the portions 57ᵃ of the conductors 57 will be closed, whereby the current will flow through the motor 55 for rotating the motor in the opposite direction. After the recording operation, the motor 55 is thus rotated in the opposite direction, for moving the poise 52 back to initial position, it being noted that when the armature hook 66 is attracted by the electromagnet 73, the circuit through the electromagnet 70 is closed for lifting the scale beam 51. The scale beam 51 being lifted opens the circuits through the electromagnets 73, 75 and 77, and when the poise 52 is returned to initial position, it will swing the switch lever 88 into engagement with the contact 84 for closing the circuit through the electromagnet 82 and the electromagnet 82 will therefore attract the armature 59 to open the switch members 58. The armature 59 is balanced, so that it will remain in either position unless disturbed by one of the electromagnets 77 and 82, whereby when the switch members 58 are closed by the attraction of armature 59 to the electromagnet 77, the switch members 58 will remain closed after the electromagnet 77 is deënergized until the electromagnet 82 is energized when the poise 52 is returned to initial position, and in which event the switch members 58 will be opened to stop the motor.

Having thus described the invention, what is claimed as new is:

1. In a weighing apparatus, the combination with a scale beam and a poise slidable thereon; of operating means for advancing the poise and another means for moving it backwardly along the beam, means for arresting the advancement of the poise when the beam tilts, a recording device including a recording member and a marking element coöperable therewith, means for advancing the recording member proportionately to the advance of the poise along the beam, means operated when the beam drops to operate the marking element, means for bringing the operating means into operation for advancing the poise, means operated when the beam drops to set the operating means into operation for moving the poise backwardly along the beam to its initial position, and means operated when the poise is returned to initial position to stop the operating means.

2. In a weighing apparatus, the combination with a scale beam and a poise slidable thereon, of operating means for advancing the poise and another means for moving it backwardly along the beam, a recording device including a recording drum or type wheel and a marking element coöperable therewith, a screw carried by said drum or wheel and threadedly engaged to said beam, means operatively connecting said screw and the poise whereby the drum is rotated and shifted proportionately to the amount that the poise is advanced along the beam, means operated when the beam drops to operate the marking element, means for setting the operating means into operation for advancing the poise, means operated when the beam drops to set the operating means into operation for moving the poise backwardly along the beam, and means operated when the poise is returned to initial position to stop the operating means.

3. In a weighing apparatus, the combination of a scale beam, a poise slidable thereon, a screw mounted on said beam, a recording drum or type wheel operated by said screw, means operatively connecting the screw and poise whereby the drum or wheel is rotated and moved longitudinally by said screw proportionately to the movement of said poise along said beam, a marking element in coöperative relation to said drum or wheel, and means for actuating said marking element in coöperative relation to the movements of said beam.

4. In a weighing apparatus, a scale beam, a poise carried thereby, means for moving said poise to and fro on said beam, a recording device including a recording member and a coöperating marking member, mean for moving the recording member rotatively and longitudinally proportionately to the movement of said poise on said beam, means operated by the depression of said beam by said poise for operating said marking member, and means operated by the return of said poise to its initial position to stop the operating means of the poise.

5. In a weighing apparatus, a scale beam, a poise carried by and slidable thereon, means for advancing and retracting said poise along said beam, a recording device and a coöperating marking element in coöperative relation to said poise, means for operating said recording device rotatively and longitudinally as said poise is advanced along said beam, means for actuating said marking element upon the depression of said beam by said poise, and means operated by the return of said poise to its initial position for stopping the operating means of the poise.

In testimony that I claim the foregoing as my own, I have hereto affixed my signature in the presence of two witnesses.

Laredo, Texas, May 31st, 1915.

SAMUEL T. FOSTER, Jr.

Witnesses:
   O. C. ULMER,
   E. A. ATLEE.